United States Patent
Parry et al.

(10) Patent No.: US 8,219,719 B1
(45) Date of Patent: Jul. 10, 2012

(54) SAS CONTROLLER WITH PERSISTENT PORT CONFIGURATION

(75) Inventors: Owen Parry, Colorado Springs, CO (US); Brad D. Besmer, Colorado Springs, CO (US); Ming-Jen Wang, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/021,890

(22) Filed: Feb. 7, 2011

(51) Int. Cl.
*G06F 3/00* (2006.01)
*G06F 13/00* (2006.01)

(52) U.S. Cl. ............ 710/8; 710/104; 709/221; 714/1

(58) Field of Classification Search ........... 710/8–14, 710/104; 709/220, 221; 714/1
See application file for complete search history.

(56) References Cited

U.S. PATENT DOCUMENTS

| | | | |
|---|---|---|---|
| 7,412,631 B2 * | 8/2008 | Uddenberg et al. | 714/47.1 |
| 7,502,865 B2 | 3/2009 | Seto | |
| 8,082,368 B2 * | 12/2011 | Hsu et al. | 709/250 |
| 2005/0080881 A1 * | 4/2005 | Voorhees et al. | 709/220 |
| 2006/0031612 A1 * | 2/2006 | Bashford et al. | 710/74 |
| 2006/0230125 A1 * | 10/2006 | Johnson | 709/220 |
| 2007/0011373 A1 * | 1/2007 | Marks et al. | 710/104 |
| 2007/0093124 A1 * | 4/2007 | Varney et al. | 439/499 |
| 2007/0094472 A1 * | 4/2007 | Marks et al. | 711/170 |
| 2007/0294572 A1 * | 12/2007 | Kalwitz et al. | 714/9 |
| 2008/0091933 A1 * | 4/2008 | Marks et al. | 713/2 |
| 2008/0247420 A1 * | 10/2008 | Marks et al. | 370/475 |
| 2009/0007155 A1 | 1/2009 | Jones et al. | |
| 2009/0037565 A1 | 2/2009 | Andresen et al. | |
| 2009/0037638 A1 * | 2/2009 | Izuta et al. | 710/316 |
| 2009/0282175 A1 * | 11/2009 | Steinmetz et al. | 710/39 |
| 2010/0049919 A1 * | 2/2010 | Winokur et al. | 711/114 |
| 2011/0022736 A1 * | 1/2011 | Uddenberg et al. | 710/2 |
| 2011/0320708 A1 * | 12/2011 | Otaka et al. | 711/114 |

* cited by examiner

*Primary Examiner* — Christopher B Shin
(74) *Attorney, Agent, or Firm* — Suiter Swantz pc llo (57) ABSTRACT

An apparatus and method are disclosed for maintaining consistent port and PHY configuration information in an SAS controller when connected SAS devices are rebooted, reset or otherwise temporarily disconnected. Configuration information is stored in non-volatile memory, and restored by a methodology to prevent port conflicts.

20 Claims, 4 Drawing Sheets

SAS CONTROLLER WITH PERSISTENT PORT CONFIGURATION

TECHNICAL FIELD

This disclosure relates to multi-computer data transferring in electrical computers and digital processing systems, and more particularly to SAS controllers in a network.

BACKGROUND AND PRIOR ART

Small Computer System Interface (SCSI) is a set of standards and protocols for physically connecting and transferring data between computers and peripheral devices. SCSI is most commonly used to connect computers to memory devices such as hard drives or tape drives. Serial Attached SCSI (SAS) is a computer bus used to move data to and from computer memory storage devices using SCSI standards and protocols.

SAS controllers are devices with multiple bi-directional SAS connection points (PHYs). A PHY is a transceiver that electrically interfaces with a physical link and implements portions of the protocol that encodes data and manages reset sequences. Each PHY in an SAS controller may be connected to an SAS device; the PHY includes hardware for implementing communication to and from the connected SAS device. PHYs are organized into ports to facilitate and simplify the processes of connecting to the SAS device connected to a particular PHY; for example, one SAS device may be connected to an SAS controller by several PHYs, those PHYs may be associated with a single port (wide port) such that access to the SAS device is by reference to the common port, thereby increasing the bandwidth of the port, and the SAS controller is responsible for efficiently load balancing across all PHYs.

SAS controllers may require each PHY to be manually configured, making the initial setup a time consuming, laborious process. Furthermore, any changes to the topology of the system is equally time consuming and laborious, and prone to human error. Some SAS controllers contain functionality to automatically configure ports and PHYs, thereby eliminating the human factor, and allowing the system to easily incorporate changes in topology.

SAS devices occasionally lose power, reboot, reset or otherwise lose connectivity to an SAS controller. A device attempting to sent or retrieve information from a port associated with a PHY that is no longer connected to an SAS device would encounter a significant error condition. SAS controllers containing functionality to automatically configure ports and PHYs recognize the failed connection as a change to the topology of the system and deactivate ports associated with PHYs that are no longer connected to an SAS device. This behavior prevents other devices from attempting to access the disconnected SAS device, but also disassociates the SAS device from a port which may be known to other devices wishing to connect to the SAS device when and if the SAS device re-connects to the SAS controller.

SUMMARY

The present invention provides a method and apparatus for maintaining consistent SAS port configurations across attached SAS device reboots, power cycles, and chip resets. The apparatus is an SAS controller with a plurality of PHYs, a processing unit, and non-volatile memory. The SAS controller retains configuration information for a PHY in a PHY configuration data structure, in the non-volatile memory, even when an SAS device is disconnected from the PHY in anticipation of the SAS device potentially being re-connected to the same PHY.

The method for maintaining consistent SAS port configurations includes clearing the SAS address of an SAS device from a PHY configuration data structure when the SAS device is disconnected from a PHY associated with the PHY configuration data structure, and setting a link alias associated with the PHY to an invalid value to prevent other devices from attempting to communicate with the SAS device through the PHY, but retaining the SAS address of the SAS device in a port configuration data structure.

If the SAS device is re-connected to the same PHY, for example the SAS device completes a power cycle, the SAS controller automatically reconfigures the PHY using information stored in the PHY configuration data structure and the port configuration data structure. The SAS controller then compares the PHY to every other automatically configured PHY to ensure that no PHYs have conflicting configuration information.

DETAILED DESCRIPTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
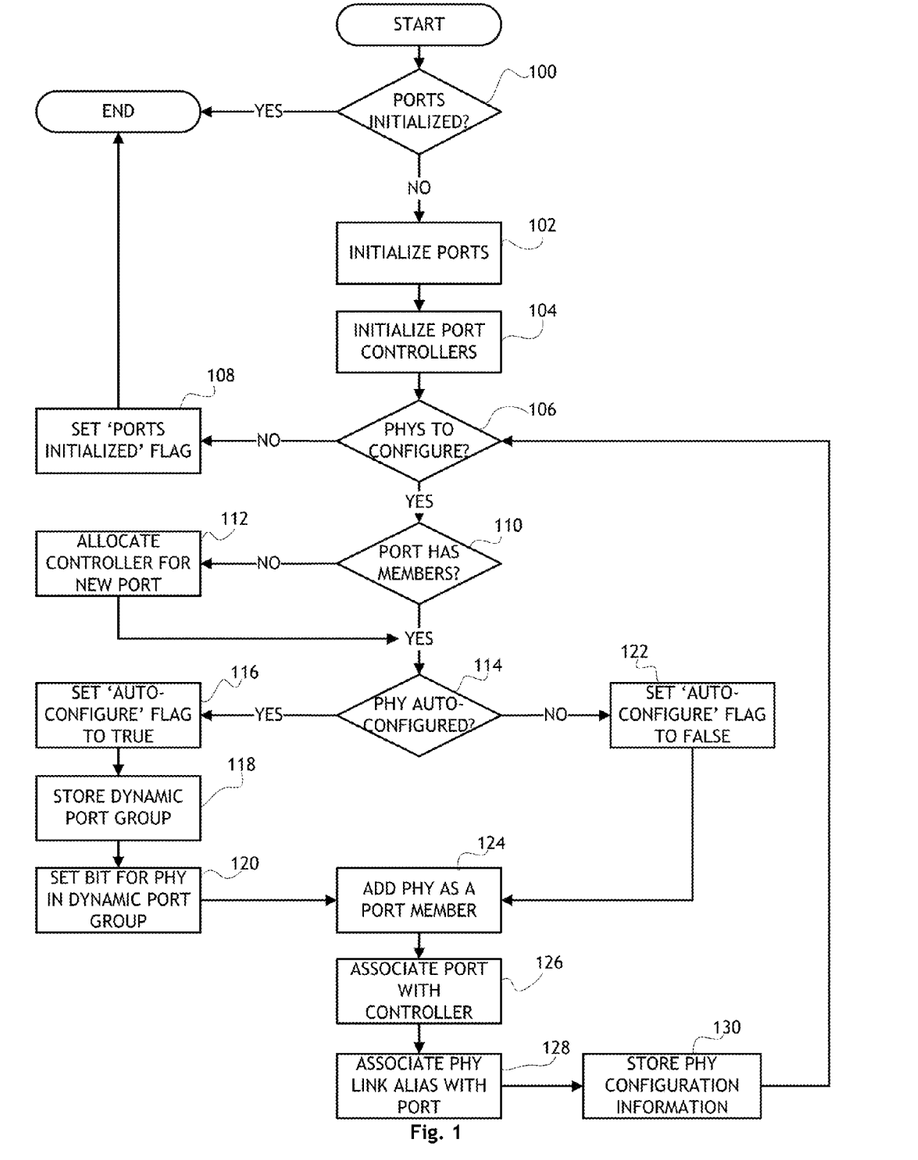
FIG. 1 shows a flowchart depicting one embodiment of the present invention.

Referring to FIG. 1, exemplary operations for a method for establishing an initial configuration for an SAS controller are shown. The method may be performed by a processing unit within the SAS controller. The SAS controller may comprise one or more PHYs organized into one or more ports. Each port may be represented by a port configuration data structure and each PHY may be represented by a PHY configuration data structure. At operation 100, the SAS controller may first determine if ports associated with the SAS controller have already been initialized; if the ports have been initialized, executing a method to establish an initial configuration for such ports may be undesirable and the method may terminate. If the ports have not been initialized, the SAS controller may initialize all ports 102 by assigning predetermined values to elements in each port configuration data structure. The predetermined values may be derived from configuration data stored in memory within the SAS controller. The SAS controller may initialize one or more port controllers 104; a port controller represents an SAS address associated with a SAS device. Each port controller may be represented by a port controller configuration data structure. Then the SAS controller may determine if there are PHYs to configure 106. If there are no PHYs to configure, the SAS controller may set an internal flag indicating that an initial port configuration has been completed 108 and the method may terminate. If there are PHYs to configure, the SAS controller may sequentially process each PHY to add that PHY to an appropriate port. Ports may be initially associated with PHYs based on the configuration data stored in the SAS controller. At operation 110, the SAS controller may determine if the port associated with each PHY during each sequential iteration is already associated with any existing member PHYs. If the port is not associated with any existing member PHYs, the SAS controller may allocate a port controller for the port 112. The SAS controller may then determine if the PHY is to be automatically or manually configured 114 based on configuration data stored in the SAS controller. If the PHY is to be automatically configured, the SAS controller may set a flag 116 in the PHY configuration data structure associated with that PHY indicating that the PHY is to be automatically configured; the SAS controller may then store a value 118 representing a dynamic port group in the PHY configuration data structure based on the configuration data stored in the SAS controller; the SAS controller may then set a data element in a global data structure 120 representing the dynamic port group indicating that the PHY belongs to that dynamic port group. On the other hand, if the PHY is to be manually configured, the SAS controller may set a flag 122 in the PHY configuration data structure associated with that PHY indicating that the PHY is to be manually configured. For both automatically and manually configured PHYs, the SAS controller may then add the PHY 124 as a member of the associated port by recording the port number in a data element in the PHY configuration data structure associated with the PHY, and recording data in the port configuration data structure indicating that the PHY is a member of that port; specifically, the SAS controller may set a bit representing the PHY in a bit mask member of the port configuration data structure. The SAS controller may then associate 126 the port with the port controller by storing the port number in the port controller configuration data structure associated with the port controller. The SAS controller may then associate 128 the PHY with the port by setting a data element in the SAS controller hardware, specifically associated with the PHY, to a value uniquely identifying the port. Finally, the SAS controller may store 130 PHY configuration information for the PHY such as the port and dynamic port group associated with the PHY. The same process may be performed for each PHY in the SAS controller.

By this method, an SAS controller may be configured to an initial state based on configuration data stored in the SAS controller. The SAS controller may support manually configured PHYs and automatically configured PHYs; however, manually configured PHYs should not be associated with the same port as automatically configured PHYs because changes in the topography of a system may result in changes to automatically configured PHYs which are not reflected in corresponding changes to manually configured PHYs, potentially resulting in incompatible port assignments.

Figure 2:
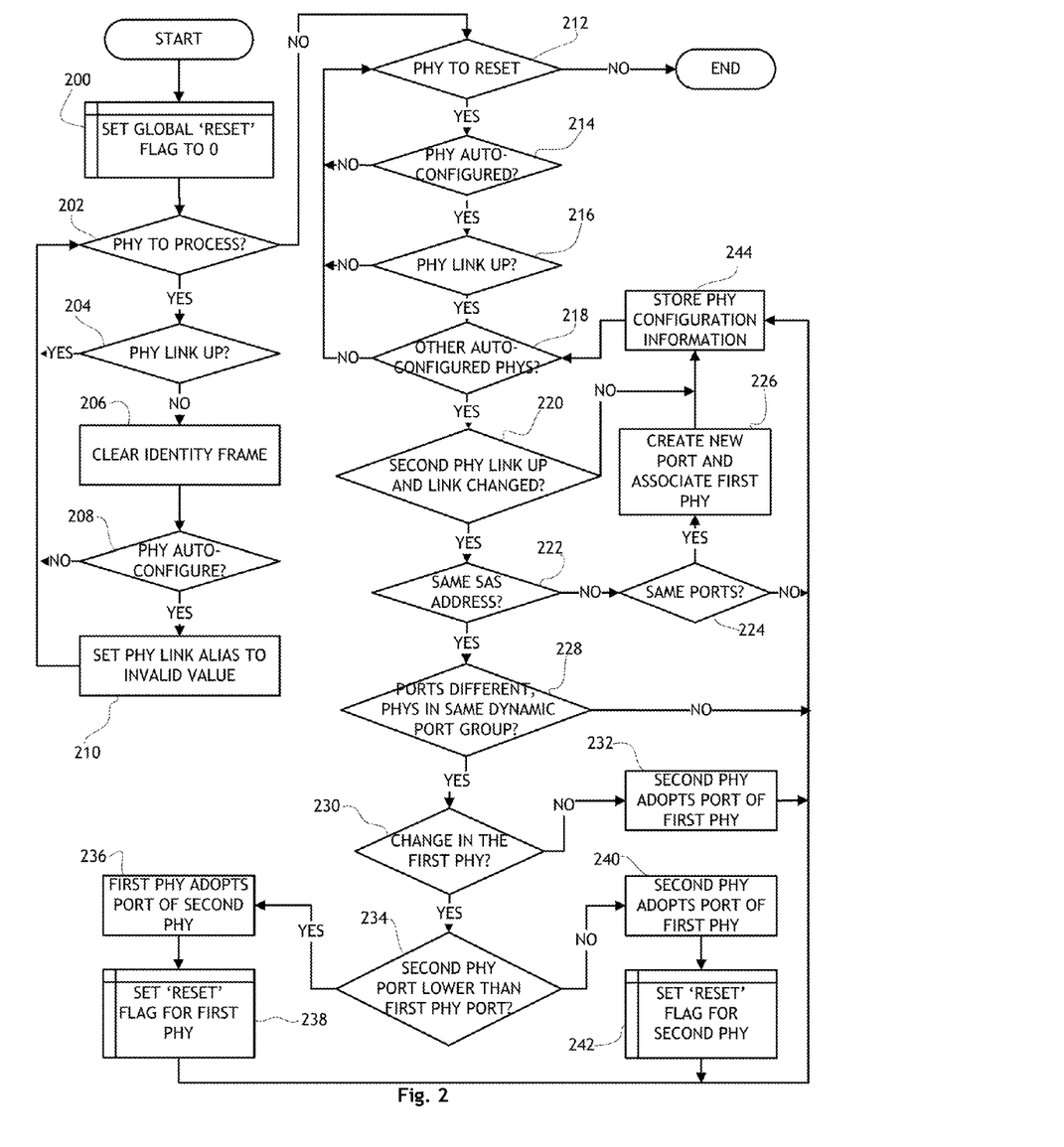
FIG. 2 shows a flowchart depicting another embodiment of the present invention.

Referring to FIG. 2, exemplary operations for a method for automatically re-configuring an SAS controller, after the SAS controller is initially configured based on configuration data stored in memory in the SAS controller, whenever a state change event occurs are shown. A state change event is a change in the state of a PHY of the SAS controller, such as an SAS device being connected or disconnected from the PHY, an SAS device connected to the PHY rebooting, or an SAS device connected to the PHY powering down. Whenever a state change event occurs, the SAS controller may set an internal flag indicating that the SAS controller requires re-configuration. Flags allow for the bifurcation of the process of monitoring PHYS for state change events, and the process of re-configuring PHYs whenever state change events occur. The SAS controller may then execute the present method.

The SAS controller may first reset 200 the internal flag indicating that the SAS controller requires re-configuration. The SAS controller may then iteratively process each PHY on the SAS controller by determining 202, before each iteration, if there are PHYs to process. For each PHY being processed, the SAS controller may determine 204 if the PHY link is currently active; a PHY link is active when the PHY is connected to an SAS device that is able to send and receive data. If the PHY link is active, the SAS controller may move on to the next PHY, if it is not active the SAS controller may clear 206 a data element storing an SAS address in a PHY configuration data structure associated with the PHY. The SAS address may be the address of the SAS device attached to the PHY. Where a single SAS device is attached to multiple PHYs on an SAS controller, the SAS address stored in each PHY configuration data structure associated with each PHY may be identical. Once the data element storing the SAS address is cleared, the SAS controller may determine 208 if the PHY is automatically configured or manually configured; if the PHY is manually configured, the SAS controller may move on to the next PHY, if the PHY is automatically configured, the SAS controller may set 210 a data element in the SAS controller hardware, specifically associated with the PHY to an invalid value, but maintain the PHY configuration data structure in its current state. By maintaining the PHY configuration data structure, the PHY can be re-configured at a later time to the same port and/or dynamic port group settings if the SAS device previously attached to the PHY is re-connected. The SAS controller may then move on to the next PHY until each PHY has been processed.

Once all the PHYs on the SAS controller have been processed, the SAS controller may reset each PHY so that other SAS devices attached to the SAS controller will see changes to the PHY configuration. The SAS controller may iteratively process 212 each PHY to be reset. For each PHY, the SAS controller may determine 214 whether the PHY is automatically or manually configured; if the PHY is manually configured, the SAS controller may move on to the next PHY, if the PHY is automatically configured, the SAS controller may determine 216 if the PHY is active. If the PHY is inactive, the SAS controller may move on to the next PHY, if the PHY is active, the SAS controller may determine 218 if there are other automatically configured PHYs, then it may iteratively compare the current PHY (first PHY) to every other automatically configured PHY, where the SAS controller may compare the first PHY to a single other automatically configured PHY (second PHY) from a list of all automatically configured PHYs until the first PHY has been compared to every other automatically configured PHY in the list.

The SAS controller may first determine 220 if the second PHY is active and if a state change event has occurred pertaining to the second PHY. If the second PHY is not active, or a state change event has not occurred pertaining to the second PHY, the SAS controller may store 244 PHY configuration information for the first PHY and move on to compare the first PHY the next automatically configured PHY. Otherwise, the SAS controller may determine 222 if the first PHY and the second PHY share the same SAS address by comparing a data element storing such SAS address for each PHY in respective PHY configuration data structures, or by querying such information directly from the SAS devices attached to each PHY; if the SAS address of the first PHY and the second PHY are different, the SAS controller may determine 224 if they are assigned the same port, if they are not assigned the same port, the SAS controller may store 244 PHY configuration information for the first PHY and move on to compare the first PHY the next automatically configured PHY; if the first PHY and second PHY share the same port, the SAS controller may create 226 a new port and associates the first PHY with the new port, then store 244 PHY configuration information for the first PHY and move on to compare the first PHY to the next automatically configured PHY. If the first PHY and the second PHY share the same SAS address, the SAS controller may determine 228 whether the first PHY and the second PHY are associated with different ports, but in the same dynamic port group. Ordinarily, when an SAS device is connected to an SAS controller by multiple PHYs, each PHY is associated with the same port to form a wide port. Dynamic port groups are an artificial construct to allow PHYs connecting the same SAS device and SAS controller to be associated with different ports. If the first PHY and the second PHY share the same SAS address, they must necessarily connect to the same SAS device; therefore, if they are in the same dynamic port group, they should also be associated with the same port. If that is the case, the SAS controller may store 244 PHY configuration information for the first PHY and move on to compare the first PHY to the next automatically configured PHY; if that is not the case, either the first PHY or the second PHY may require additional re-configuration. The SAS controller may determine 230 if any change has occurred in the configuration of the first PHY since the last re-configuration based on a data element in the PHY configuration data structure associated with the first PHY; if no change has occurred, the SAS controller may associate 232 the second PHY with the port associated with the first PHY, then store 244 PHY configuration information for the first PHY and move on to compare the first PHY to the next automatically configured PHY. If a change has been made to the first PHY, the SAS controller may determine 234 which PHY is associated with the lower port number; if the first PHY is associated with the lower port number, the SAS controller may assign 240 the port associated with the first PHY to the second PHY and set 242 a flag indicating that the second PHY needs to be reset; if the second PHY is associated with the lower port number, the SAS controller may assign 236 the port associated with the second PHY to the first PHY and set 238 a flag indicating that the first PHY needs to be reset again. In either case, the SAS controller may then store 244 PHY configuration information for the first PHY and move on to compare the first PHY to the next automatically configured PHY. The above method indicates a preference for lower port numbers; the preference for lower port numbers is an arbitrary condition to resolve conflicts between port numbers, any deterministic mechanism for resolving such conflicts is acceptable. Once the SAS controller has iteratively re-configured all PHYs and made appropriate port number changes, all PHY configuration data structures are stored in a persistent, non-volatile memory element. By this method, port and dynamic port group information associated with PHYs in an SAS controller is retained and restored when an SAS device is disconnected and subsequently re-connected to the same PHY. This method is also tolerant of changes to the topology of SAS devices connected to an SAS controller such that port numbers and dynamic port group settings are not retained when SAS devices are disconnected from PHYs on an SAS controller and different SAS devices are subsequently connected to those PHYs.

Figure 3:
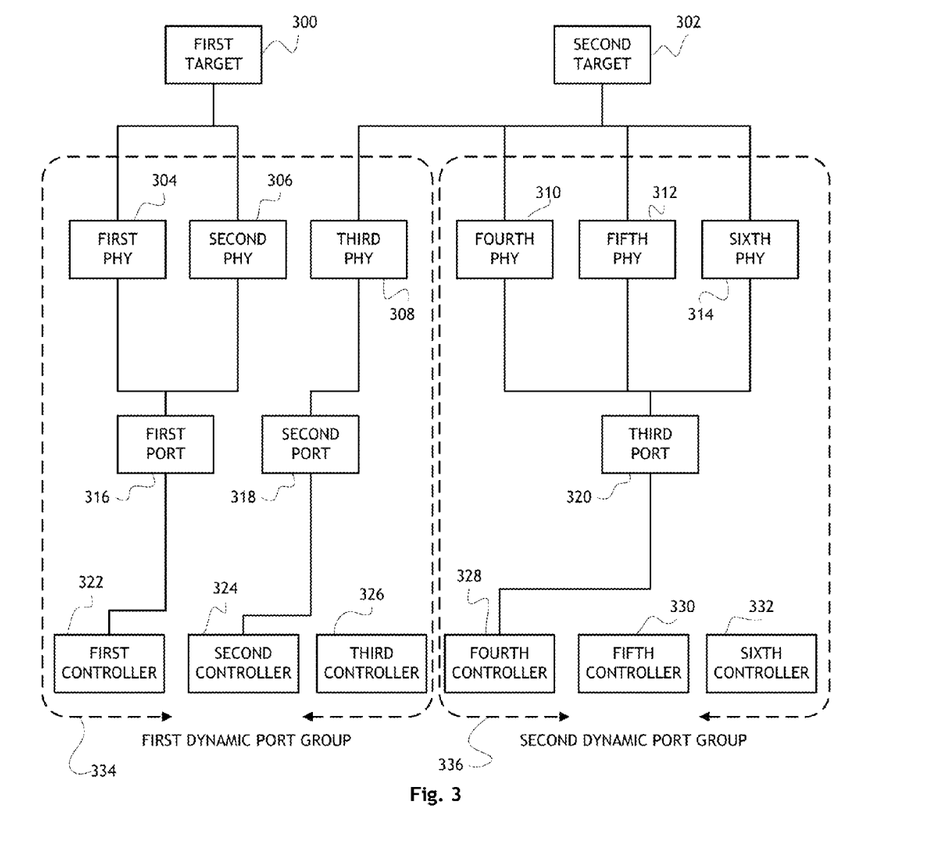
FIG. 3 shows a chart depicting the organizational structure of an SAS controller configured according to the methods depicted in FIG. 1 and FIG. 2.
Figure 4:
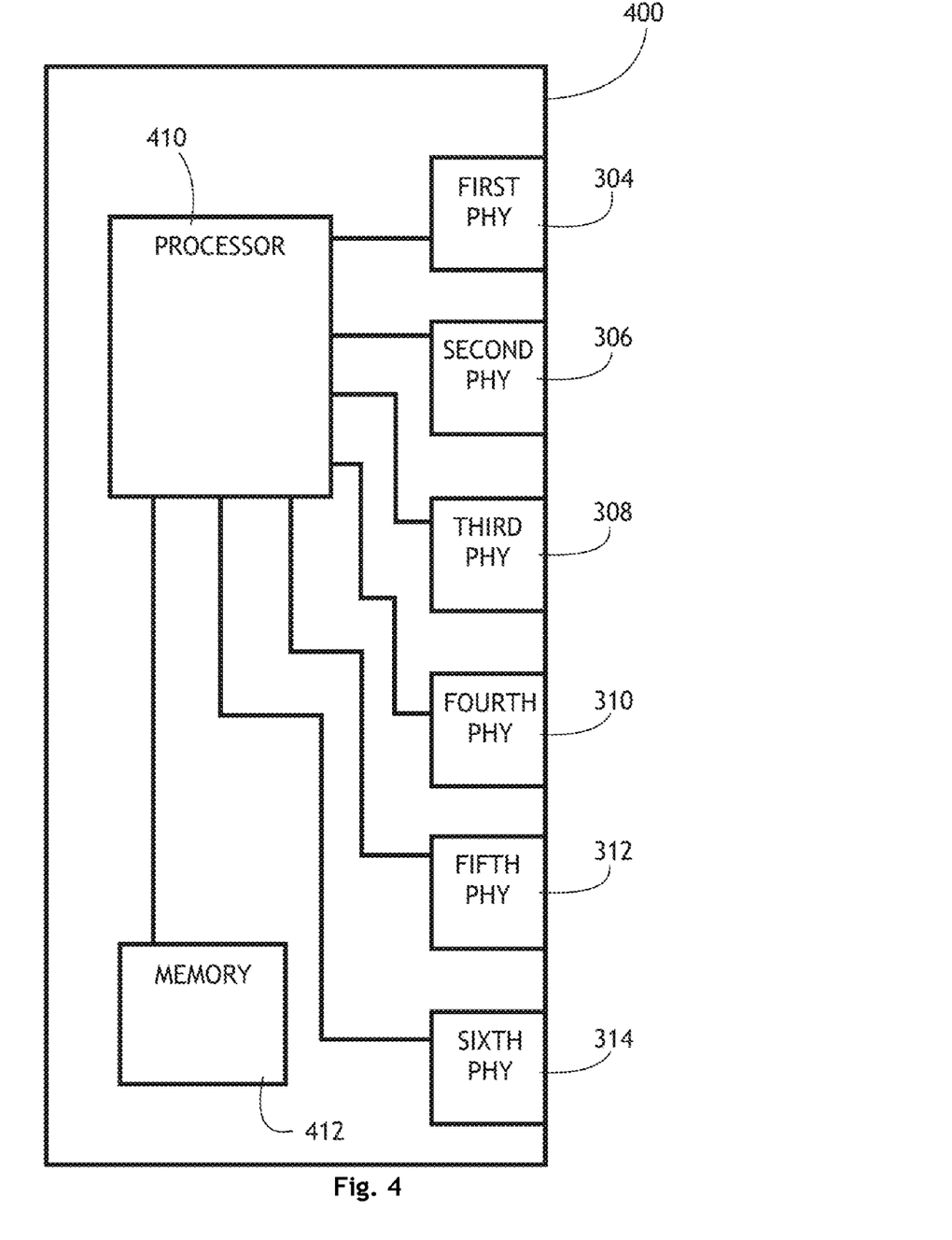
FIG. 4 shows a block diagram of an SAS controller configured to implement the methods shown in FIG. 1 and FIG. 2.

Referring to FIG. 3 and FIG. 4, an SAS controller 400 according to the resent invention may have a plurality of PHYs 304, 306, 308, 310, 312, and 314, a processing unit 410, and memory 412 functionally connected to the processing unit 410. The memory 412 may be some type of non-volatile memory such as flash memory. PHYs are physical connection points in an SAS controller for connecting other SAS devices such as a first target 300 and second target 302. SAS devices may be connected to an SAS controller by more than one PHY; for example, the first target 300 may be connected to a first PHY 304 and a second PHY 306, while the second target may be connected to a third PHY 308, a fourth PHY 310, a fifth PHY 312 and a sixth PHY 314. SAS controllers typically associated PHYs with ports. Ports are artificial constructs designed to facilitate communication in an SAS controller 400 by allowing SAS devices to send and receive data packets to and from a port rather than a specific PHY. A port is a higher level communication mechanism than a PHY. Where a single SAS device is connected to an SAS controller 400 through more than one PHY, the SAS controller 400 may assign the same port to each PHY connecting the SAS device to the SAS controller 400; for example, the first PHY 304 and the second PHY 306 may both be associated with a first port 316. It may, however, be advantageous to divide a multi-PHY connection between an SAS device and an SAS controller 400 into more than one port. AN SAS controller 400 may use a first dynamic port group 334 and a second dynamic port group 336 to divide multiple PHYs connecting an SAS device such as the second target 302 to an SAS controller 400. The third PHY 308, in the first dynamic port group 334, may be associates with a second port 318, while the fourth PHY 310, fifth PHY 312 and sixth PHY 314, in the second dynamic port group 336, may be associated with a third port 320. Each port may be associated with a unique port controller; for example, the first port 316 may be associated with a first port controller 322, the second port 318 may be associated with a second port controller 324, and the third port 320 may be associated with a fourth port controller 328. The SAS controller 400 may maintain port controllers unassociated with any port; for example, a third port controller 326 within the first dynamic port group 334, and a fifth port controller 330 and sixth port controller 332 within the second dynamic port group 336 may be maintained by the SAS controller 400; unassociated ports may be used as the topology of attached SAS devices changes. Port controllers are data elements that contain the SAS address of the SAS device attached to the PHYs associated with the port associated with the port controller. Information contained in a port controller is used when identifying information is sent on link up.

The SAS controller 400 may initialize all of the PHYs, and associate each PHY with a port based on some initial configuration data stored in memory 412. The initial configuration data may include ports associated with each manually configured PHY and dynamic port groups associated with each automatically configured PHY. The SAS controller 400 may initially associate every automatically configured PHY in the same dynamic port group with the same port, creating one initial wide port in that dynamic port group. The SAS controller may then monitor each PHY for state change events and subsequently create new ports and associate PHYs with those ports as necessary according to the methods and criteria herein described.

In the event an attached SAS device such as the first target 300 looses power, reboots, or is otherwise disconnected from the SAS controller 400, the SAS controller 400 may register a state change event in the first PHY 304 and the second PHY 306. The SAS controller 400 may set a flag in PHY configuration data structures associated with the first PHY 304 and the second PHY 306 indicating that those PHYs require re-configuration; the SAS controller 400 may also set a global flag indicating that PHYs require re-configuration. Only PHYs designated as automatically configured in the PHY configuration data structure for that PHY are subject to full re-configuration; the ports associated with manually configured PHYs may remain statically configured even if a state change event occurs.

The SAS controller 400 may re-configure all PHYs flagged as having undergone a state change event. In the present example, the SAS controller 400 may first determine if the first PHY 304 is active. If the first PHY 304 is not active, the SAS controller 400 may remove the SAS address of the first target 300 stored in the PHY configuration data structure associated with the first PHY 304. Then if the first PHY 304 is automatically configured, the SAS controller 400 may set the hardware link alias associated with the first PHY 304 to an invalid value to ensure no SAS device can attempt to communicate with the first target 300 through the first PHY 304. The SAS controller 400 may then perform the same procedures on the second PHY 306. Then, if no other PHYs have undergone a state change event, the SAS controller 400 may reset the first PHY 304 and the second PHY 306, and may reset an appropriate flag in the PHY configuration data structure for each PHY indicating that the PHY has been reset. In the present case, the SAS controller 400 may determine that the first PHY 304 is automatically configured and that the first PHY 304 is inactive. If the first PHY 304 is inactive, no further configuration may be required. The SAS controller may perform the same procedures on the second PHY 306. The SAS controller may maintain all of the port and dynamic port group information pertaining to the first PHY 304 and the second PHY 306 stored in their respective PHY configuration data structures, in memory 412. By preserving port and dynamic port group information associated with PHYs after a state change event, an SAS controller may restore PHYs to their original configuration after a subsequent state change event wherein the same SAS device attached to the same PHY or PHYs is re-activated.

When an attached SAS device such as the first target 300 re-connects to the SAS controller 400 after loosing power, rebooting, or otherwise disconnecting from the SAS controller 400, the SAS controller 400 may register a state change event in the first PHY 304 and the second PHY 306 indicating that those PHYs require re-configuration; the SAS controller 400 may also set a global flag indicating that PHYs require re-configuration. If the first PHY 304 and the second PHY 306 had previously been active, port and dynamic port group information associated with those PHYs would be stored in PHY configuration data structures in memory 412. The SAS controller 400 may first determine if the first PHY 304 is active. If the first PHY 304 is active, the SAS controller 400 may store the SAS address of the first target 300 in the PHY configuration data structure associated with the first PHY 304 and set the hardware link alias associated with the first PHY 304 to an appropriate value indicating an association between the PHY and a port. The SAS controller 400 may then perform the same procedures on the second PHY 306. Then the SAS controller 400 may reset the first PHY 304 and the second PHY 306, and may reset an appropriate flag in the PHY configuration data structure for each PHY indicating that the PHY has been reset. In the present case, the SAS controller 400 may determine that the first PHY 304 is automatically configured and that the first PHY 304 is active. The SAS controller 400 may then compare the first PHY 304 to every other automatically configured PHY to identify and correct any conflicts in the configuration of any automatically configured PHYs. Comparing the first PHY 304 with the second PHY 306, the SAS controller 400 may determine that the second PHY 306 is active and has undergone a state change event. The SAS controller 400 may then determine if the first PHY 304 and the second PHY 306 are attached to the same SAS device based of the SAS address of the SAS device. If the first PHY 304 and the second PHY 306 are attached to the same SAS device, the SAS controller 400 may determine if the first PHY 304 and the second PHY 306 are associated with different ports in the same dynamic port group based on the PHY configuration data stored in the PHY configuration data structure associated with each PHY. In the present example, the first PHY 304 and the second PHY 306 are not associated with different ports in the same dynamic port group, therefore there is no conflict between the configuration settings of the first PHY 304 and the second PHY 306, and the SAS controller 400 may proceed to compare the first PHY 304 to other automatically configured PHYs such as the third PHY 308. If the third PHY 308 has not undergone a state change event, no further configuration is necessary. The same is true for the fourth PHY 310, the fifth PHY 312 and the sixth PHY 314. The SAS controller has thereby automatically re-configured PHYs after multiple state change events to restore deactivated and subsequently reactivated PHYs to their original port and dynamic port group configurations.

Although the disclosure has been described in terms of specific embodiments, one skilled in the art will recognized that various modifications may be made that are within the scope of the present disclosure. Therefore, the scope of the disclosure should not be limited to the foregoing description. Rather, the scope of the disclosure should be determined based upon the claims recited herein, including the full scope of equivalents thereof.

What is claimed is:

1. AN SAS controller apparatus comprising:
   a processor;
   non-volatile memory configured to store port and PHY configuration information, operably connected to the processor;
   a plurality of PHYs, each configured to connect to an SAS device, operably connected to the processor; and
   computer executable program code, configured to:
   automatically configure at least one of the plurality of PHYs, running on the processor;
   store PHY configuration information in the memory; and
   re-configure one or more PHYs based on such PHY configuration information after the one or more PHYs undergoes a state change event.

2. The apparatus of claim 1 wherein an SAS device connected to the one or more PHYs looses connectivity to the one or more PHYs and subsequently regains connectivity to the one or more PHYs when no intervening SAS device was connected to the one or more PHYs.

3. The apparatus of claim 1 wherein the computer executable program code is further configured to:
   set a data element in a data structure associated with one of the plurality of PHYs indicating that the one of the plurality of PHYs is automatically configured;
   store dynamic port group information in a data structure associated with the one of the plurality of PHYs indicating that the one of the plurality of PHYs is a member of a dynamic port group;
   set a data element in a data structure associated with at least one port indicating that the one of the plurality of PHYs is a member of the at least one port;
   set a data element in a data structure associated with a port controller indicating that at least one port is associated with the port controller; and
   set a data element in a data structure associated with a hardware link alias associated with the one of the plurality of PHYs, indicating that the one of the plurality of PHYs is associated with the at least one port wherein the at least one port does have member PHYs.

4. The apparatus of claim 1 wherein the computer executable program code is further configured to:
allocate a port controller for at least one port, wherein the at least one port does not have any member PHYs;
set a data element in a data structure associated with one of the plurality of PHYs indicating that the one of the plurality of PHYs is automatically configured;
store dynamic port group information in a data structure associated with the one of the plurality of PHYs indicating that the one of the plurality of PHYs is a member of some dynamic port group;
set a data element in a data structure indicating that the one of the plurality of PHYs is a member of some dynamic port group;
set a data element in a data structure associated with the at least one port indicating that the one of the plurality of PHYs is a member of the at least one port;
set a data element in a data structure associated with a port controller indicating that at least one port is associated with the port controller; and
set a data element in a data structure associated with a hardware link alias associated with the one of the plurality of PHYs, indicating that the one of the plurality of PHYs is associated with the at least one port wherein the at least one port does have member PHYs.

5. The apparatus of claim 1, wherein the computer executable program code is further configured to:
determine if one or more of the plurality of PHYs has undergone a state change event;
determine if one of the plurality of PHYs is active; and
determine if the one of the plurality of PHYs is automatically configured.

6. The apparatus of claim 5, wherein the computer executable program code is further configured to:
clear an SAS address from a data element configured to store an SAS address; and
set a hardware link alias configured to refer to the one of the plurality of PHYs to some invalid value, wherein the one of the plurality of PHYs is inactive and is automatically configured.

7. The apparatus of claim 5, wherein the computer executable program code is further configured to:
compare the one of the plurality of PHYs to a second PHY in the plurality of PHYs, wherein the second PHY in the plurality of PHYs is automatically configured, and wherein the second PHY in the plurality of PHYs has undergone a state change event; and
determine if the one of the plurality of PHYs and the second PHY in the plurality of PHYs are attached to a single SAS device, wherein the one of the plurality of PHYs is active and is automatically configured.

8. The apparatus of claim 7, wherein the computer executable program code is further configured to:
create a new port; and
associate the one of the plurality of PHYs with the new port, wherein the one of the plurality of PHYs and the second PHY in the plurality of PHYs are not attached to the same SAS device, and wherein the one of the plurality of PHYs and the second PHY in the plurality of PHYs are associated with the same port.

9. The apparatus of claim 7, wherein the computer executable program code is further configured to:
modify configuration information for the one of the plurality of PHYs such that the one of the plurality of PHYs and the second PHY in the plurality of PHYs are associated with the same port, wherein the one of the plurality of PHYs and the second PHY in the plurality of PHYs are associated with different ports in the same dynamic port group, and wherein the one of the plurality of PHYs and the second PHY in the plurality of PHYs are attached to the same SAS device; and
set a data element in a data structure associated with the on of the plurality of PHYs, wherein the data element is configured to indicate that the one of the plurality of PHYs requires an additional reset operation.

10. The apparatus of claim 7, wherein the computer executable program code is further configured to:
modify configuration information for the second PHY in the plurality of PHYs such that the one of the plurality of PHYs and the second PHY in the plurality of PHYs are associated with the same port, wherein the one of the plurality of PHYs and the second PHY in the plurality of PHYs are associated with different ports in the same dynamic port group, and wherein the one of the plurality of PHYs and the second PHY in the plurality of PHYs are attached to the same SAS device; and
set a data element in a data structure associated with the second PHY in the plurality of PHYs, wherein the data element is configured to indicate that the second PHY in the plurality of PHYs requires an additional reset operation.

11. A method for configuring a PHY in an SAS controller, comprising:
initializing at least one port in the SAS controller;
initializing at least one port controller in the SAS controller;
determining if the at least one port has any member PHYs;
associating the at least one port with the PHY;
associating the at least one port controller with the at least one port;
storing configuration information associated with the PHY; and
restoring the PHY to a configuration state based on stored configuration information associated with the PHY in response to a state change event occurring after the storing configuration information associated with the PHY.

12. The method of claim 11, further comprising:
setting a data element in a data structure associated with the PHY indicating that the PHY is automatically configured;
storing dynamic port group information in a data structure associated with the PHY indicating that the PHY is a member of some dynamic port group;
setting a data element in a data structure indicating that the PHY is a member of some dynamic port group;
setting a data element in a data structure associated with the at least one port indicating that the PHY is a member of the at least one port;
setting a data element in a data structure associated with a port controller indicating that the at least one port is associated with the port controller; and
setting a data element in a data structure associated with a hardware link alias associated with the PHY, indicating that the PHY is associated with the at least one port, wherein the at least one port does have member PHYs.

13. The method of claim 11, further comprising allocating a port controller for the at least one port, wherein the at least one port does not have any member PHYs.

14. The method of claim 12, further comprising:
setting a data element in a data structure associated with the PHY indicating that the PHY is automatically configured;
storing dynamic port group information in a data structure associated with the PHY indicating that the PHY is a member of some dynamic port group;
setting a data element in a data structure indicating that the PHY is a member of some dynamic port group;
setting a data element in a data structure associated with the at least one port indicating that the PHY is a member of the at least one port;
setting a data element in a data structure associated with a port controller indicating that the at least one port is associated with the port controller; and
setting a data element in a data structure associated with a hardware link alias associated with the PHY, indicating that the PHY is associated with the at least one port.

15. A method for re-configuring a PHY in an SAS controller, comprising:
determining if the PHY is active;
determining if the PHY is automatically configured;
storing configuration information associated with the PHY; and
restoring the PHY to a configuration state based on stored configuration information associated with the PHY,
wherein the PHY has undergone a state change event after storing configuration information associated with the PHY.

16. The method of claim 15, further comprising:
clearing an SAS address from a data element configured to store an SAS address; and
setting a hardware link alias configured to refer to the PHY to some invalid value,
wherein the PHY is inactive, and wherein the PHY is automatically configured.

17. The method of claim 15, further comprising:
comparing the PHY to a second PHY, wherein the second PHY is automatically configured, and wherein the second PHY has undergone a state change event; and
determining if the PHY and the second PHY are attached to a single SAS device,
wherein the PHY is active, and wherein the PHY is automatically configured.

18. The method of claim 17, further comprising:
creating a new port; and
associating the PHY with the new port,
wherein the PHY and the second PHY are not attached to the same SAS device, and wherein the PHY and the second PHY are associated with the same port.

19. The method of claim 17, further comprising:
modifying configuration information for the PHY such that the PHY and the second PHY are associated with the same port, wherein the PHY and the second PHY are associated with different ports in the same dynamic port group, and wherein the PHY and the second PHY are attached to the same SAS device; and
setting a data element in a data structure associated with the PHY, wherein the data element is configured to indicate that the PHY requires an additional reset operation.

20. The method of claim 17, further comprising:
modifying configuration information for the second PHY such that the PHY and the second PHY are associated with the same port, wherein the PHY and the second PHY are associated with different ports in the same dynamic port group, and wherein the PHY and the second PHY are attached to the same SAS device; and
setting a data element in a data structure associated with the second PHY, wherein the data element is configured to indicate that the second PHY requires an additional reset operation.

* * * * *